United States Patent [19]
Troost

[11] 3,879,828
[45] Apr. 29, 1975

[54] METHOD OF MAKING A ROLLER ASSEMBLY

[76] Inventor: Alex Troost, Nizzaallee 57, 51 Aachen, Germany

[22] Filed: Mar. 21, 1974

[21] Appl. No.: 453,301

[30] Foreign Application Priority Data
Mar. 27, 1973 Germany.............................. 2315090

[52] U.S. Cl............................... 29/148.4 D; 29/447
[51] Int. Cl......................... B23p 11/00; B23p 11/02
[58] Field of Search............ 29/148.4 D, 132, 447, 29/148.4 R, 29/129.5

[56] References Cited
UNITED STATES PATENTS
3,014,266  12/1961  Samuels et al................. 29/148.4 D
3,574,252  4/1971  Rackoff............................ 29/447 X

*Primary Examiner*—Thomas H. Eager
*Attorney, Agent, or Firm*—W. G. Fasse; W. W. Roberts

[57] ABSTRACT

The present method produces composite bodies, such as steel mill rollers, having a core and a jacket, by providing initially prior to shrinking the jacket onto the core, a gap between the core and the jacket with a width which varies over the length of the jacket especially as a function of the loads, such as the shearing load, whereby a more favorable load carrying capacity and thus an extended service life are obtained. Preferably, the roller has a core with a convex surface and the jacket has a wall thickness which increases from the edges of the jacket towards the center of the jacket to provide either a cylindrical or convex outer surface for the finished roller.

13 Claims, 5 Drawing Figures

SHRINKING STRESS c'

BENDING STRESS d'

RESULTING LOAD e'

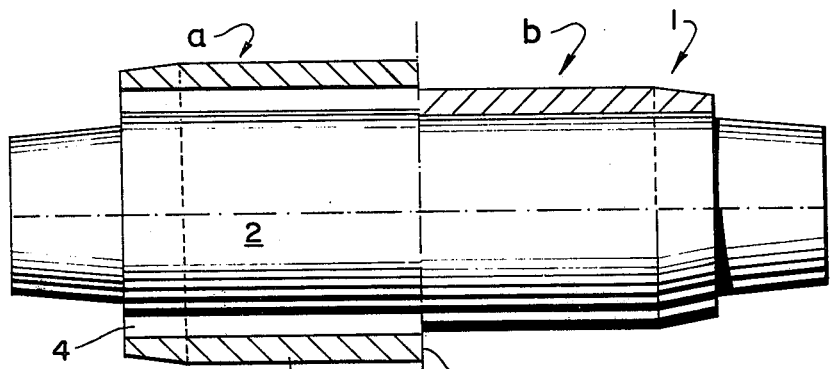
FIG.1
PRIOR ART
SHRINKING STRESS c
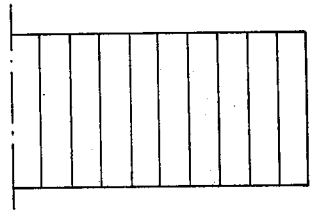
BENDING STRESS d
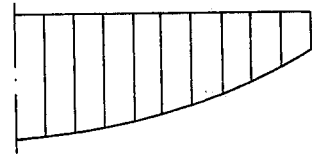
RESULTING LOAD e
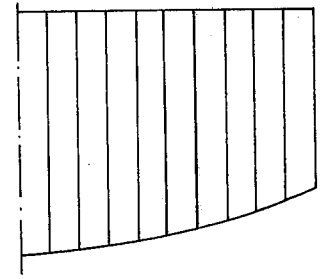

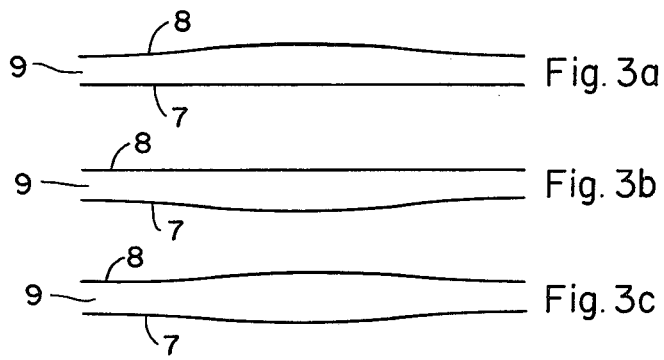
Fig. 3a
Fig. 3b
Fig. 3c
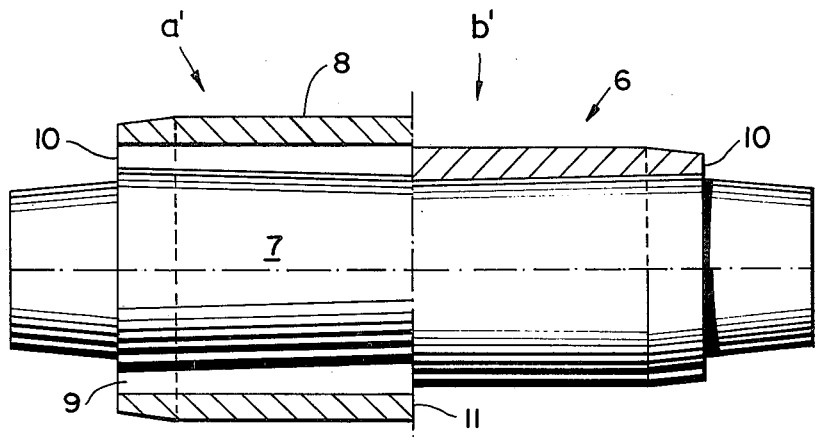
FIG.2
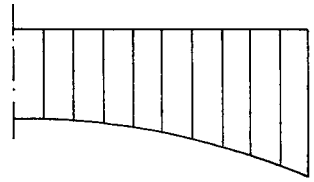
SHRINKING STRESS  c'
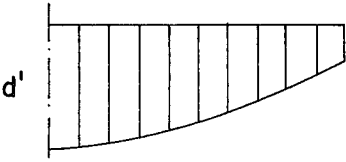
BENDING STRESS  d'
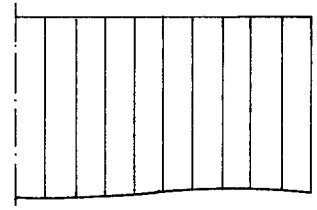
RESULTING LOAD  e'

METHOD OF MAKING A ROLLER ASSEMBLY

BACKGROUND OF THE INVENTION

The present invention relates to composite bodies and a method of producing such bodies, especially rollers for steel mills or the like, having a core surrounded by a jacket whereby the force locking contact between the core and the jacket is accomplished preferably by thermal and/or metal-lurgical shrinking. Initially a gap is provided between the core and the jacket by dimensioning or deforming at least one of the two members of the composite body prior to the fitting of the jacket over the core. The force locking connection between the two members, namely the jacket and the core is then accomplished by a renewed deformation of one or the other member.

In connection with composite bodies manufactured by so called shrinking methods and having, for example, a rotational symmetry, it is necessary to provide a force locking connection between the members of the composite body whereby the connection must also be resistant against shearing loads along the shrink interface. These features are necessary in order to obtain a composite body capable of taking up bending loads and having a moment of inertia which is substantially larger than the sum of the moments of inertia of the individual members or components of the composite body although the cross sectional area of the composite body is only equal to the sum of the individual cross sectional areas. As a result, the respectively higher moment of resistance causes correspondingly smaller bending loads which in turn result in smaller comparable loads. Such comparable loads include local loads as for example, the shearing force, the torque moment, the normal force and the shrinking load or stress.

In view of the above considerations it is desirable to employ the so called shrinking construction methods for producing composite roller bodies, especially where the production of supporting rollers for four-high stand steel mills is involved wherein these rollers comprise a core and a jacket. This type of shrinking construction has made it possible to produce rollers having a tough inner steel core and a jacket with high surface hardness.

However, prior art construction methods still leave room for improvement, especially since prior art rollers do not provide a sufficient safety against the localized loosening of the jacket from the core. Further, prior art rollers are still subject to so called shell chipping which means that portions of the jacket chip out of the roller surface. These difficulties are due to the fact that it is rather critical to select the proper shrinking tension. On the one hand, a shrinking force or tension which is too small causes the above mentioned localized loosening of the shell or jacket from the core. On the other hand, if the shrinking force is selected to avoid such localized loosening the shrinking force becomes large enough to cause said chipping of the jacket, whereby portions of the jacket simply break out of the roller surface. As a result, the load capacity of prior art rollers is limited or reduced by these considerations.

Furthermore, working loads which exceed the rated loads of prior art rollers may cause a substantial reduction in the fatigue stability and the load bearing capability due to the fact that remainder loads resulting from the shrinking of the jacket onto the core remain effective in the longitudinal and tangential direction of the roller core. As a result, the roller becomes useless mainly due to the fact that the jacket starts slipping relative to the core.

In order to improve the resistance against slipping in a circumferential direction it has been suggested heretofore to provide the cooperating surfaces of the core and jacket with a shape which does not have rotational symmetry, for example, an oval shape. However, this prior art teaching while providing an improved resistance against slipping in the circumferential direction does not improve the safety against slipping in the axial direction. In fact, the safety against slipping between the jacket and the core in the axial direction is reduced by this approach as compared to cooperating surfaces having a shape of rotational symmetry.

In order to reduce the tension forces or loads remaining after the shrinking of the jacket onto the core, it is necessary to make the so called shrinking ratio as small as possible. This requirement, however, has its limitation in the further requirement that the force locking between the jacket and the core must not be removed. In order to satisfy these requirements which in a way oppose each other, it has already been proposed to make the shrinking ratio between jacket and core as small as possible and to employ simultaneously a layer of glue between the contacting surfaces. However, experience has shown that so far no type of glue is capable of withstanding the loads resulting from the different working loads. This is presumably due to the fact that presently available glues have a substantially smaller module of elasticity and a substantially smaller material strength as compared to the steel employed in making the steel mill rollers. In fact, the differences correspond to several orders of magnitude.

OBJECTS OF THE INVENTION

In view of the foregoing, it is the aim of the invention to achieve the following objects singly or in combination:

to overcome the drawbacks of the prior art, especially to produce a composite body by connecting a core and a jacket in a force locking manner by causing diameter variations of the core and/or of the jacket by thermal, and/or metallurgical means;

to improve the resistance against slippage between the core and the jacket or shell in a circumferential direction as well as in a longitudinal axial direction;

to provide a method for combining a core and jacket by employing shrinking techniques while simultaneously permitting a sufficiently large shrinking ratio without thereby reducing the load capacity or rather the service life of the composite roller body;

to use such a shape for the outer surface of the core and for the jacket, that the effects of any loads remaining as a result of the shrinking process are minimized; and to adapt the shrinking ratio, namely, the ratio of the outer and inner diameter of the cooperating surfaces, along the length of these cooperating surfaces to the load conditions to which the composite body may be subjected.

SUMMARY OF THE INVENTION

The method according to the invention adapts the width of the original gap between the outer surface of the core and the inner surface of the jacket along the length of the composite body to varying load conditions, especially the shearing loads. Stated differently, the width of the gap will vary according to the invention along the length of the gap.

The teaching of the invention takes into account that the pressures in the roller gap occurring during the actual operation of the rollers are distributed in a certain manner due to the fact that the working rollers are supported against bending by so called support rollers. As a result, the pressure is distributed more or less evenly over the roll barrel length between the working roller and the respective supporting roller. This pressure distribution causes a respective sectional load on the supporting roller.

Applying the rules of statics relating to a simple beam supported at both ends to the barrel of the supporting roller and taking into account said sectional load as well as the moments resulting from supporting or bearing forces and its spacing from the barrel edge one obtains a partially constant or continuous characteristic or curve for the shearing force beginning from the left edge of the barrel. Incidentally the term "barrel" as used herein refers to the working surface of the roller. The resulting shearing loads have a corresponding characteristic or curve due to the fact that the shearing loads are proportional to the shearing force. This distribution curve extends over the roll barrel length and passes through 0, for example, at the center of the barrel, if the load is distributed symmetrically relative to the barrel center.

In order to assure the proper locking between the core and the jacket it is necessary to substantially cover or compensate for the shearing load resulting from the shearing force at the interface between the jacket and the core, by the friction which is proportional to the forming pressure, when the composite body is formed. To this end, the invention teaches to adapt the size of the forming pressure, for example, where the bending moment includes shearing forces, to the enveloping characteristic of all possible shearing force functions. Generally such adaptation will take into account not only the functions of the shearing loads, but also the stiffness of the jacket wall against bending and the tensile strength of the jacket wall. The advantage of this teaching of the invention resides in a lower residual forming stress of the jacket and/or the core. The resulting stress which combines the residual forming stress and the working load stress is hence substantially smaller as compared to the resulting stress in prior art composite bodies. Hence, the invention substantially increases the safety against material failures such as chipping of the jacket especially in its outer surface. Alternatively, a substantially increased load capacity is achieved according to the invention where the safety factor is merely equal to that of the prior art composite bodies.

BRIEF FIGURE DESCRIPTION

In order that the invention may be clearly understood, it will now be described, by way of example, with reference to the accompanying drawings, wherein:

FIG. 1 illustrates a composite body according to the prior art comprising a steel mill roller with a cylindrical core and a jacket whereby the lefthand half of the illustration is shown prior to the shrinking while the righthand half is shown after the shrinking is completed;

FIG. 2 is an illustration similar to that of FIG. 1 but showing an embodiment according to the invention wherein again the lefthand portion is shown prior to the shrinking and the righthand portion is shown after the shrinking; and FIGS. 3a, 3b, and 3c illustrate different gap shapes according to the invention, between the jacket and the roller core.

DETAILED DESCRIPTION OF EXAMPLE EMBODIMENTS

Referring to FIG. 1, there is shown a steel mill roller 1 of the prior art. The lefthand portion $a$ is illustrated in its condition prior to the shrinking. The righthand portion $b$ is shown after the shrinking and partially in section. Between the core 2 and the jacket 3 there is provided a gap 4 prior to the shrinking. It will be noted that the gap 4 has a uniform width throughout its length.

Below the righthand portion $b$ there is shown the shrinking stress $c$ after the jacket 3 has been shrunk onto the core 2. It will be noted that the shrinking stress $c$ is uniformly distributed over the length of the jacket or rather over the effective working surface of the roller.

Below the shrinking stress $c$ there is shown the bending stress $d$, which increases from the edges of the jacket 3 toward the center 5 of the roller 1.

The resulting load $e$ which combines the residual shrinking stress $c$ and the load resulting from the bending stress $d$ is shown in FIG. 1 below the bending stress $d$. It will be noted that the resulting load or stress $e$ also increases from the edges of the jacket 3 towards the center of the roller though in a somewhat less pronounced manner than the bending stress.

It has been found that the uniform distribution of the residual shrinking stress $c$ as shown in FIG. 1 not only reduces the load bearing capacity of the roller, but also reduces the working life of prior art rollers because it facilitates the above mentioned surface chipping of the roller jacket.

FIG. 2 illustrates a roller constructed in accordance with the teachings of the invention, whereby the same manner of illustration is employed to facilitate the comparison.

The roller 6 according to the invention comprises a core 7 and a jacket 8 which prior to the shrinking process form a gap 9 between the outer surface of the core 7 and the inner surface of the jacket 8 as shown in the lefthand portion $a$ of FIG. 2. According to the invention, the outer surface of the core 7 or the inner surface of the jacket 8 are formed in such a manner that the width of the gap 9 increases from the edges 10 toward the center 11 of the roller. Due to this feature the residual shrinking stress $c$ according to the invention has a different distribution as compared to the residual shrinking stress $c$ shown in FIG. 1. According to the invention, the shrinking stress is largest at the edges 10 of the roller and diminishes gradually toward the center of the roller.

The bending stress $d$ is substantially the same as the bending stress $d$ assuming that the same loads are applied in both instances.

Due to the different distribution of the shrinking stress $c'$ accomplished according to the invention, the resulting load $e'$ has also a different distribution as compared with the resulting load $e$ in FIG. 1. It will be noted that the resulting load $e'$ according to the invention has a substantially uniform distribution over the entire length of the roller. What is even more important, the uniformly distributed resulting load according to the invention corresponds in size substantially to the smallest load occurring in the prior art roller shown in FIG. 1. In other words, the uniformly distributed resulting load $e'$ does not build up to its largest value in the center of the roller.

The same scale has been used in FIGS. 1 and 2 in order to clearly show the advantage achieved according to the invention in the form of an increased load capacity or in the form of a prolonged service life of a roller according to the invention as compared with the roller according to FIG. 1.

In FIG. 2 the varying width of the gap 10 is accomplished by providing the jacket 8 with a cylindrical inner surface and by providing the core 7 with a conical outer surface, whereby the diameter of the core gradually decreases from its edges toward the center. It will be appreciated that the teaching of the invention may also be realized by providing the core 7 with a concave outer surface or by providing the jacket 8 with a concave inner surface. Such concave surface forms will provide the varying width of the gap 10 in order to adapt the forming or joining pressure which is proportional to the difference between the inner diameter of the jacket 8 and the outer diameter of the core 7, to the enveloping function of all possible shearing load functions.

According to the invention it is also possible to provide only a central portion of the outer core surface or of the inner jacket surface with a concave shape and to keep the edge portions of the respective surface cylindrical, whereby the concave portion merges smoothly at both ends into said cylindrical portion.

According to the invention it is further possible that the varying width of the gap corresponds to a mathematical function or curve which represents the distribution of the load stresses, especially of the shearing load stresses, the shrinking stresses and which also takes into account the deformability of the jacket 8 and the core 7. In this connection it should be mentioned that such curve representing the variations of the gap width may be incorporated entirely into the outer surface of the core or entirely into the inner surface of the jacket. In the alternative, the curve may be realized by shaping the inner surface of the jacket or at the outer surface of the core in any desired ratio.

It has been found that the thermal treatment for the shrinking is preferably accomplished in such a manner that the jacket placed over the core is first cooled from the center portion outwardly toward the edges, while maintaining the edge portions at the shrinking temperature. In any event, the reduction of the gap width between the members of the composite body until a force locking contact is established, may be accomplished by thermal and/or mechanical and/or metallurgical means for causing the diameter variations of the core and/or of the jacket.

In connection with the thermal shrinking axially effective normal stresses may occur in the core and/or in the jacket due to the axial shortening of the jacket when the latter is cooling down, or due to the lengthening of the core when the core is heated. Such cooling or heating also causes respective shearing stresses in the interface between the core and jacket, as well as in the cross section of the composite body. These stresses occur due to the narrow gap width adjacent the ends of the jacket, when the ends of the jacket are already in force locking contact with the core before the composite body has reached its normal temperature. However, this locking of the ends of the jacket before the remainder of the jacket reaches the required locking contact is easily avoided or the resulting stresses are easily minimized according to the invention by controlling the transition from the shrink temperature to the normal temperature. Thus, as mentioned above, the central portion of the jacket is first cooled outwardly toward the edge portions, while the latter are still kept at the shrink temperature.

A similar control may be accomplished in an advantageous manner by raising the temperature of the central region of the core to a point above the normal temperature of the composite body but below the shrink temperature, whereby the above mentioned stresses are also easily minimized.

A similar control may be accomplished by means of a mechanical stretching of the core prior to the thermal shrinking of the jacket onto the core. Advantageously, the core and/or the jacket may be stretched and/or subjected to pressure prior to the shrinking, whereby such stretching or compressing is relieved after the jacket has cooled down. Thus, it is possible to achieve either in the core or in the jacket a pressure load condition, which will compensate for the varying width during the shrinking process.

According to a further modification of the invention it is possible to subject the core prior to the shrinking to a mechanical pressure load and to superimpose on the thermal stretching of the jacket a mechanical stretching while maintaining the central portion of the jacket at an elevated temperature and simultaneously cooling the portions adjacent to the edges until the force locking contact is accomplished adjacent to the edges of the jacket whereafter the load causing the stretching of the jacket is removed.

In view of the above, it will be appreciated that a roller according to the invention constitutes a composite body of rotational symmetry in which either the core and/or the jacket have a concave polished surface adjacent the interface between the core and the jacket and wherein the thickness of the jacket wall increases from the edges of the jacket towards the center thereof in such a manner that the outer surface of the finished roller is either cylindrical or if desired the finished roller may have a convex outer surface.

Although the invention has been described with reference to specific example embodiments, it is to be understood, that it is intended to cover all modifications and equivalents within the scope of the appended claims.

What is claimed is:

1. A method for producing a composite body having at least two members by shrinking a jacket onto a core, said body having a given length over which said composite body is subject to varying stresses, comprising providing said core with given outer dimensions, providing the jacket with given inner dimensions, selecting said inner and outer dimensions to provide an initial gap between said jacket and core prior to said shrinking, said gap having a width depending on said inner and outer dimensions and adapting the size of said gap width along said length to said varying stresses whereby said gap width constitutes a function of said stresses.

2. The method according to claim 1, wherein the width of said gap is selected to increase from the outer edges of said jacket toward the center of the jacket.

3. The method according to claim 2, comprising providing said jacket with an inner surface having a concave sectional shape to provide for said gap width increase.

4. The method according to claim 2, comprising providing said core with an outer surface having a concave sectional shape to provide for said gap width increase.

5. The method according to claim 1, comprising providing said core with a cylindrical outer surface and providing said jacket with an inner surface having a concave shape in the middle portion and substantially cylindrical shapes at the end portions thereof, said concave shape merging smoothly into said cylindrical shapes.

6. The method according to claim 1, comprising providing said core with an outer surface having a concave shape in the middle portion and substantially cylindrical shapes at the end portions opposite said jacket, said concave shape of said outer core surface merging smoothly into said cylindrical shapes, and providing said jacket with a substantially cylindrical inner surface.

7. The method according to claim 1, comprising determining the width of said gap as a mathematical function representing the distribution of stresses along said length, said stresses including load stresses, especially load shearing stresses, said mathematical function further taking into account the deformability of said jacket and of said core.

8. The method according to claim 1, wherein said shrinking is accomplished by heating said jacket, placing the jacket over the core, and cooling the jacket in a controlled manner so that cooling begins substantially at the center of the jacket and progresses outwardly from the center of the jacket toward the ends of the jacket while said ends are still held at the shrinking temperature.

9. The method according to claim 1, comprising accomplishing said shrinking by raising the temperature of the central area of said core above the normal temperature of the composite body and keeping said raised temperature below the shrinking temperature.

10. The method according to claim 1, comprising subjecting at least one of the members of the composite body prior to the shrinking to a stretching load, and removing said stretching load after cooling.

11. The method according to claim 1, comprising subjecting at least one of the members of the composite body prior to the shrinking to a compression load, and removing said compression load after cooling.

12. The method according to claim 1, comprising subjecting said core to a compression load prior to the shrinking, subjecting said jacket prior to the shrinking to a thermal stretching load and simultaneously to a mechanical stretching load superimposed on said thermal stretching load, cooling the end portions of the jacket while still maintaining the central portion of the jacket at an elevated temperature relative to the temperature of the end portions, continuing said cooling of the end portions of the jacket until the shearing resistant locking between these jacket end portions and the core is accomplished and then removing the stretching loads from the jacket.

13. The method according to claim 1, comprising employing a core and a jacket which are of rotational symmetry relative to a common rotational axis.

* * * * *